United States Patent [19]

Degnan et al.

[11] Patent Number: 5,573,657
[45] Date of Patent: Nov. 12, 1996

[54] HYDROGENATION PROCESS

[75] Inventors: Thomas F. Degnan; Richard C. Dougherty, both of Moorestown; George H. Hatzikos, Mantua; Stuart S. Shih, Cherry Hill, all of N.J.; Tsoung Y. Yan, Philadelphia, Pa.

[73] Assignee: Mobil Oil Corporation, Fairfax, Va.

[21] Appl. No.: 309,288

[22] Filed: Sep. 20, 1994

Related U.S. Application Data

[63] Continuation-in-part of Ser. No. 177,693, Jan. 5, 1994, abandoned, which is a continuation of Ser. No. 734,990, Jul. 24, 1991, abandoned.

[51] Int. Cl.$^6$ .................................................... C10G 45/00
[52] U.S. Cl. .......................... 208/144; 208/143; 208/18; 585/250; 585/255; 585/275
[58] Field of Search .................................... 208/143, 144, 208/18; 585/250, 255, 275

[56] References Cited

U.S. PATENT DOCUMENTS

| | | | |
|---|---|---|---|
| 3,149,178 | 9/1964 | Hamilton et al. | 260/683.9 |
| 3,742,082 | 6/1973 | Brennan | 260/683.9 |
| 3,780,128 | 12/1973 | Shubkin et al. | 260/683.9 |
| 4,172,855 | 10/1979 | Shubkin et al. | 585/16 |
| 4,827,064 | 5/1989 | Wu | 585/10 |
| 4,827,073 | 5/1989 | Wu | 585/530 |
| 4,956,122 | 9/1990 | Watts et al. | 252/565 |
| 5,012,020 | 4/1991 | Jackson et al. | 585/10 |
| 5,098,684 | 3/1992 | Kresge et al. | 423/277 |
| 5,102,643 | 4/1992 | Kresge et al. | 423/328 |
| 5,105,051 | 4/1992 | Pelrine et al. | 585/528 |
| 5,132,478 | 7/1992 | Ho | 585/467 |

*Primary Examiner*—Anthony McFarlane
*Assistant Examiner*—Walter D. Griffin
*Attorney, Agent, or Firm*—Ronald A. Bleeker; Malcolm D. Keen; Penny L. Prater

[57] ABSTRACT

A hydrogenation process for reducing the unsaturation of lubricants uses a catalyst which is based on an ultra-large pore crystalline material. The crystalline material has pores of at least 13 Å diameter arranged in a uniform manner and exhibits unusually large sorption capacity demonstrated by its benzene adsorption capacity of greater than about 15 grams benzene/100 grams (50 torr and 25° C.). A preferred form of the catalyst has a hexagonal structure which exhibits a hexagonal electron diffraction pattern that can be indexed with a $d_{100}$ value greater than about 18 Å. The hydrogenation catalysts based on these materials are capable of reducing the unsaturation in poly alpha olefin lubricants to a low level.

25 Claims, 1 Drawing Sheet

HYDROGENATION PROCESS

CROSS REFERENCE TO RELATED APPLICATIONS

This application is a continuation-in-part of application Ser. No. 08/177,693 (Mobil case 6304FC), filed Jan. 5, 1994, now abandoned which is a continuation of Ser. No. 07/734,990, filed Jul. 24, 1991, now abandoned.

FIELD OF THE INVENTION

This invention relates to hydrogenation catalysts and their use in a hydrogenation process which is particularly applicable to the hydrogenation or hydrotreating of lubricant oils, especially synthetic lubricant oils produced by the oligomerization of low molecular weight olefins.

BACKGROUND OF THE INVENTION

Hydrogenation is a well-established process both in the chemical and petroleum refining industries. Hydrogenation is conventionally carried out in the presence of a catalyst which usually comprises a metal hydrogenation component on a porous support material, such as a natural clay or a synthetic oxide. Nickel is often used as a hydrogenation component, as are noble metals such as platinum, palladium, rhodium and iridium. Typical support materials include kieselguhr, alumina, silica and silica-alumina. Depending upon the ease with which the feed may be hydrogenated, the hydrogen pressures used may vary from quite low to very high values, typically from about 100 to 2,500 psig.

Hydrogenation is an exothermic process and is therefore thermodynamically favored by lower temperatures but for kinetic reasons, moderately elevated temperatures are normally used and for petroleum refining processes, temperatures in the range of 100° to 700° F. are typical. Hydrogenative treatment is frequently used in petroleum refining to improve the qualities of lubricating oils, both of natural and synthetic origin. Hydrogenation, or hydrotreating as it is frequently termed, is used to reduce residual unsaturation in the lubricating oil, and to remove heteroatom-containing impurities and color bodies. The removal of impurities and color bodies is of particular significance for mineral oils which have been subjected to hydrocracking or catalytic dewaxing. For both hydroprocessed mineral and synthetic stocks, the saturation of lube boiling range olefins is a major objective.

The polyolefins comprise one class of synthetic hydrocarbon lubricants which has achieved importance in the lubricating oil market. These materials are typically produced by the polymerization (the term oligomerization is often used for the lower molecular weight products which are used as low viscosity basestocks) of alpha olefins typically ranging from 1-octene to 1-dodecene, with 1-decene being a preferred material, although polymers of lower olefins such as ethylene and propylene may also be used, including copolymers of ethylene with higher olefins, as described in U.S. Pat. No. 4,956,122 and the patents referred to there. The poly alpha-olefin (PAO) products may be obtained with a wide range of viscosities varying from highly mobile fluids of about 2 cS at 100° C. to higher molecular weight, viscous materials which have viscosities exceeding 100 cSt at 100° C. The PAO's are conventionally produced by the polymerization of the olefin feed in the presence of a catalyst such as aluminum trichloride, or boron trifluoride or trifluoride complexes. Processes for the production of PAO lubricants in this way are disclosed, for example, in U.S. Pat. Nos. 3,382,291 (Brennan), 4,172,855 (Shubkin), 3,780,128 (Shubkin), 3,149,178 (Hamilton), 3,742,082 (Brennan), and 4,956,122 (Watts). The PAO lubricants are also discussed in Lubrication Fundamentals, J. G. Wills, Marcel Dekker Inc., New York, 1980 ISBN 0-8247-6976-7, especially pages 77 to 81. Subsequent to the polymerization, the lubricant range products are hydrogenated in order to reduce the residual unsaturation. In the course of this reaction, the bromine number of the lubricant is reduced from typical values of about 30 or higher for low viscosity PAOs and 5 to 15 for high viscosity PAOs to a value of not more than about 2 or even lower.

A novel type of PAO lubricant has recently been disclosed as having exceptional and advantageous properties. These materials are the HVI-PAO materials which are disclosed in U.S. Pat. Nos. 4,827,064 (Wu), 4,827,073 (Wu). These materials are produced by the oligomerization of alpha olefins, especially 1-decene, using a reduced Group VI metal oxide catalyst, preferably a reduced chromium oxide catalyst. The HVI-PAO products may be derivatized by reaction with aromatics, as disclosed EP 377305 and higher molecular weight versions prepared by the use of lower oligomerization temperatures, as disclosed in U.S. Pat. No. 5,012,020, to which reference is made for a disclosure of the higher molecular weight products. Although the oligomerization process using the reduced metal oxide catalysts produces a material of characteristic structure, residual unsaturation remains in the oligomer product and, like the conventional PAO oligomers, it is subjected to hydrogenation in order to improve its stability as a lubricant. The hydrogenation is carried out in the same manner as with the conventional PAO-type materials.

The catalysts used for hydrogenating lubricants, whether of mineral oil or synthetic origin, require a strong hydrogenation function provided by the metal component and an effective large pore diameter in the porous support material in order to minimize the diffusion resistance of the bulky lubricant molecules. For reactions with bulky molecules, the optimum ratio of catalytic pore diameter to molecule size is about 1.5:1. Table 1 below shows the optimum pore sizes required for normal alkanes in the C-7 to C-25 range. The table shows that for alkanes in this range, the chain-length varies from 9.9 to 37.6 Å so that active hydrogenation catalysts for these materials should have a major amount of their pore volume with pore openings in the range of 15 to 56 Å, and preferably with a major amount of this in the range 38 to 56 Å.

TABLE 1

| | Optimum Pore Size | |
|---|---|---|
| Carbon Number | Alkane Length, Å[(1)] | Optimum Pore Diameter, Å[(2)] |
| $C_7$ | 9.9 | 15 |
| $C_8$ | 11.5 | 17 |
| $C_{10}$ | 14.5 | 22 |
| $C_{12}$ | 17.6 | 26 |
| $C_{17}$ | 25.3 | 38 |
| $C_{19}$ | 28.4 | 43 |
| $C_{21}$ | 31.5 | 47 |
| $C_{23}$ | 34.6 | 52 |
| $C_{25}$ | 37.6 | 56 |

[(1)]Based on bond lengths of 1.54 and 1.11 Å for C—C and C—H bond lengths, respectively.
[(2)]Based on an optimum ratio of catalyst pore to molecule size ratio of 1.5.

Conventional amorphous support materials such as alumina, silica and silica-alumina, typically have a pore size distribution with most of the pores larger than 50 Å and most of these are larger than 100 Å. Although these large pores enable the bulky lubricant molecules to traverse the molecular structure of the catalyst freely with little diffusional resistance, the reduced surface area associated with the larger pore sizes diminishes the area which is available for the hydrogenation reactions. It would therefore be desirable to utilize a hydrogenation catalyst which possess a significant amount of its pores in the range of 15 to 60 Å, close to the optimum ratio for the lower molecular weight materials making up the bulk of many synthetic lubricants as well as the lower viscosity mineral oils.

SUMMARY OF THE INVENTION

We have now found that another class of catalytic materials the mesoporous crystalline materials—which have high pore volume, high surface area and controlled pore openings of at least 13 Å, is particularly suitable for the hydrogenation of lubricant hydrocarbons, especially synthetic PAO-type materials.

According to the present invention, the hydrogenation process utilizes a catalyst which comprises a hydrogenation function in the form of a metal on a support material which comprises a mesoporous siliceous material with a novel and unique structure and pore geometry described below. These materials are inorganic, porous, non-layered crystalline phase materials which, in their calcined forms exhibit an X-ray diffraction pattern with at least one peak at a d-spacing greater than about 18 Angstrom Units (Å). They also have a benzene adsorption capacity greater than 15 grams benzene per 100 grams of the material at 50 torr and 25° C. In a preferred form, the support material is characterized by a substantially uniform hexagonal honeycomb microstructure with uniform pores having a cell diameter greater than 13 Å and typically in the range of 20 to 100 Å. Most prominent among these materials is a new crystalline material identified as MCM-41 which is usually synthesized as a metallosilicate with Bransted acid sites by incorporating a tetrahedrally coordinated trivalent element such as Al, Ga, B, or Fe within the silicate framework. The preferred forms of these materials are the aluminosilicates although other metallosilicates may also be utilized. MCM-41 is characterized by a microstructure with a uniform, hexagonal arrangement of pores with diameters of at least about 13 Å: after calcination it exhibits an X-ray diffraction pattern with at least one d-spacing greater than about 18 Å and a hexagonal electron diffraction pattern that can be indexed with a $d_{100}$ value greater than about 18 Å which corresponds to the d-spacing of the peak in the X-ray diffraction pattern.

A preferred catalyst for the present purpose is an alumina bound crystalline material which has a significant pore volume with pore diameters greater than 200 Å. The large diameter pores provide channels for bulky PAO oligomers to transport freely with diminished diffusion resistance to the smaller particles of the crystalline material which provide a large surface area for the hydrogenation reaction. The preferred crystalline materials for use in the present process have pore diameters greater than 15 Å and the preferred pore diameters are in the range of 15 to 60 Å.

DRAWINGS

The FIGURE is a graphical representation of testing results reported in the Examples below. The FIGURE illustrates the relative effectiveness of different catalysts in the hydrogenation of PAO.

DETAILED DESCRIPTION

Figure 1:
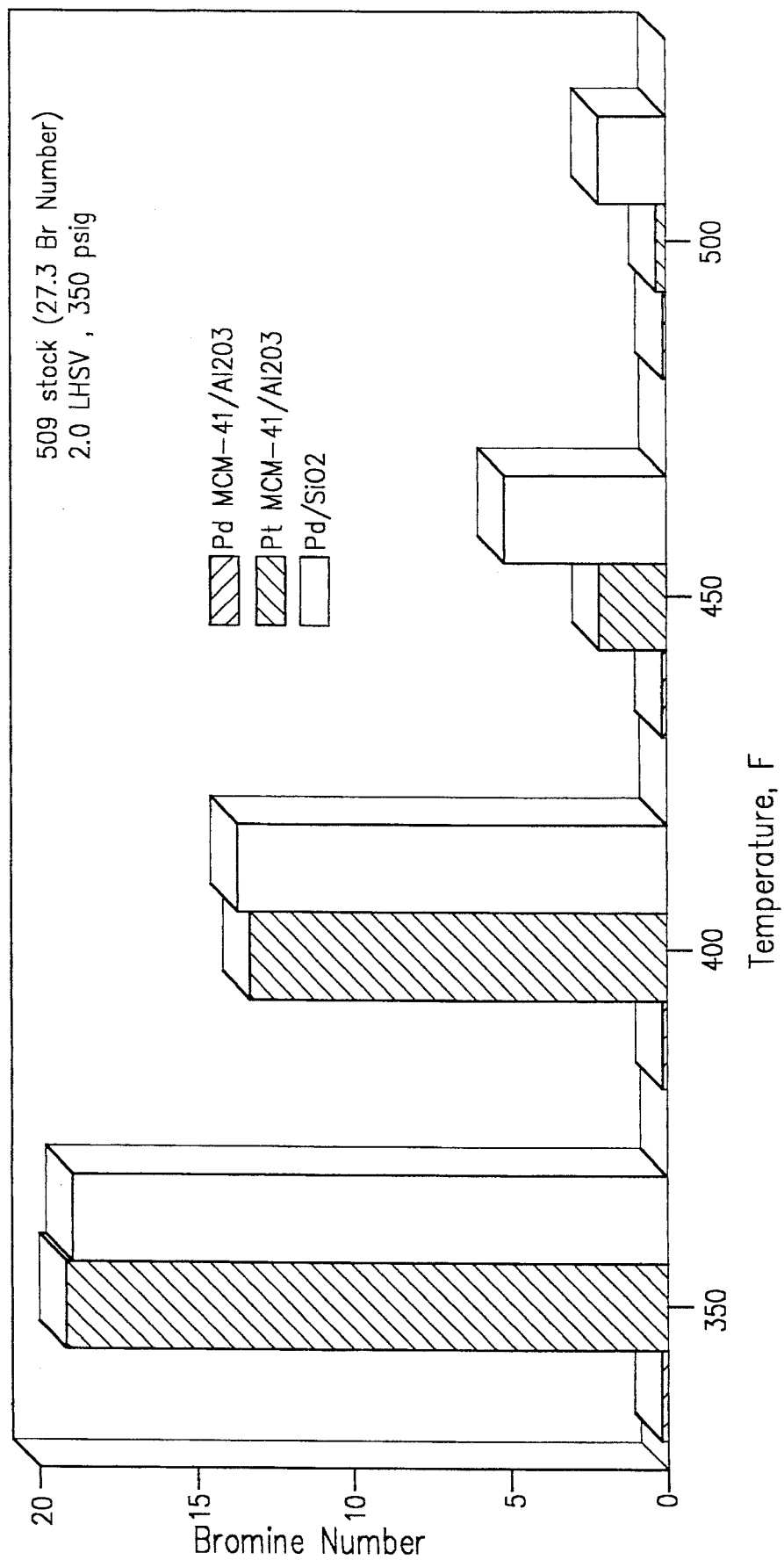

In the present process, lubricant range hydrocarbons are hydrogenated or hydrotreated in the presence of a hydrogenation catalyst which comprises a mesoporous crystalline material, preferably with a binder which possesses a significant pore volume having pore diameters greater than 200 Å. The process may be carried out with mineral oil lubricants or synthetic hydrocarbon lubricants, of which the PAO materials are preferred, both conventional type PAO's prepared using Friedel-Crafts type catalysts as well as the HVI-PAO materials produced using a reduced Group VIB metal oxide catalyst.

The mineral oil lubricants may generally be characterized as having a minimum boiling point of at least 650° F. (about 345° C.) and usually they will be neutral i.e., distillate, stocks with an end point of not more than 1050° F. (about 565° C.), although residual lube stocks such as bright stock may also be treated by the same catalytic process. Mineral oil stocks of this kind are typically prepared by the conventional refining process involving atmospheric and vacuum distillation of a crude of suitable composition, followed by removal of undesirable aromatic components by solvent extraction using a solvent such as phenol, furfural or N,N-dimethylformamide (DMF). Dewaxing to the desired product pour point may be carried out using either solvent dewaxing or catalytic dewaxing techniques and it is particularly preferred that a hydrogenative treatment according to the present invention should follow any catalytic dewaxing treatment in order to saturate lube boiling range olefins which may be produced during the catalytic dewaxing process.

The present process is, however, particularly applicable to the hydrogenative treatment of synthetic lubricating oils, especially the poly alpha-olefins (PAO) including the HVI-PAO type materials. These types of lubricants may be produced by the polymerization or oligomerization procedures described above using Friedel-Crafts type catalysts such as aluminum trichloride, boron trifluoride or boron trifluoride complexes, e.g., with water, lower alkanols or esters in the conventional manner. The HVI-PAO type oligomers may be prepared by the methods described in U.S. Pat. Nos. 4,827,064 (Wu), 4,827,073 (Wu), using a reduced Group VIB metal oxide catalyst, normally chromium on silica. The HVI-PAO materials include the higher molecular weight versions prepared by the use of lower oligomerization temperatures, as disclosed in U.S. Pat. No. 5,012,020, to which reference is made for a full description of these materials and their preparation. Derivatives of the PAO lubricants may be prepared by reaction with aromatics as disclosed, for example, in EP 377305, referred to above. The HVI-PAO materials are characterized by a branch ratio below 0.19 which results from the use of the unique reduced metal oxide catalyst during the oligomerization process.

The lubricant materials are subjected to the hydrogenative treatment in the presence of a catalyst which comprises a metal component for hydrogenation together with the mesoporous crystalline material and, optionally, a binder.

The hydrogenation reaction is carried out under conventional conditions with temperatures from about 100° to about 700° F. and preferably in the range of 150° to 500° F. Hydrogen pressure may vary up to about 2,500 psig but normally will be from about 100 to 1500 psig. Hydrogen circulation rates are typically in excess of that required stochiometrically for complete saturation ranging from 200% to 5000% stochiometric excess. Once through circulation is preferred in order to maximize the purity of the hydrogen. Space velocities are typically in the range of 0.1 to 10 LHSV, usually from 1 to 3 LHSV. The products of the hydrogenation reaction have a low degree of unsaturation consistent with the hydrogenative treatment and in most cases the bromine number of the product will be less than 3 and is often less than 1.

HYDROGENATION CATALYST

The catalytic material used in the present invention includes a novel synthetic composition of matter comprising an ultra-large pore size crystalline phase as a support for the metal component of the catalyst. This material is an inorganic, porous, non-layered crystalline phase material which can be characterized (in its calcined form) by an X-ray diffraction pattern with at least one peak at a d-spacing greater than about 18 Å with a relative intensity of 100 and a benzene sorption capacity of greater than 15 grams of benzene per 100 grams of the material at 50 torr and 25° C. The preferred form of the crystalline material is an inorganic, porous, non-layered material having a hexagonal arrangement of uniformly-sized pores with a maximum perpendicular cross-section pore dimension of at least about 13 Angstrom Units (Å), and typically within the range of from about 13 Å to about 200 Å. A preferred form of this hexagonal crystalline composition, identified as MCM-41, with the characteristic structure of hexagonally-arranged, uniformly-sized pores of at least 13 Å diameter, exhibits a hexagonal electron diffraction pattern that can be indexed with a $d_{100}$ value greater than about 18 Å which corresponds to at least one peak in the X-ray diffraction pattern. This material is described in detail in Ser. No. 07/625,245, now U.S. Pat. No. 5,098,684 (Kresge et al) and also below.

The inorganic, non-layered mesoporous crystalline material used as a component of the catalyst has the following composition:

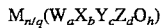

$$M_{n/q}(W_aX_bY_cZ_dO_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2. The preferred materials for use in making the present catalysts are the aluminosilicates although other metallosilicates may also be used.

In the as-synthesized form, the support material has a composition, on an anhydrous basis, expressed empirically as follows:

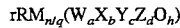

$$rRM_{n/q}(W_aX_bY_cZ_dO_h)$$

where R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods described below.

To the extent desired, the original M, e.g. sodium or chloride, ions of the as-synthesized material of this invention can be replaced in accordance with conventional ion-exchange techniques. Preferred replacing ions include metal ions, hydrogen ions, hydrogen precursor, e.g. ammonium, ions and mixtures of these ions. Particularly preferred ions are those which provide the desired metal functionality in the final catalyst. These include hydrogen, rare earth metals and metals of Groups VIIA (e.g. Mn), VIIIA (e.g. Ni), IB (e.g. Cu), IVB (e.g. Sn) of the Periodic Table of the Elements and mixtures of these ions.

The crystalline (i.e. having sufficient order to provide a diffraction pattern such as, for example, by X-ray, electron or neutron diffraction, following calcination with at least one peak) mesoporous material may be characterized by its structure, which includes extremely large pore windows as well as by its high sorption capacity. The term "mesoporous" is used here to indicate crystals having uniform pores within the range of from about 13 Å to about 200 Å. The mesoporous materials have uniform pores within the range of from about 13 Å to about 200 Å, more usually from about 15 Å to about 100 Å. Since these pores are significantly larger than those of other crystalline materials, it is appropriate to refer to them as ultra-large pore size materials. For the purposes of this application, a working definition of "porous" is a material that adsorbs at least 1 gram of a small molecule, such as Ar, $N_2$, n-hexane or cyclohexane, per 100 grams of the solid.

The catalytic material can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The preferred materials have a hexagonal arrangement of large open channels that can be synthesized with open internal diameters from about 13 Å to about 200 Å. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The most regular preparations of the support material give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hkO subset of unique reflections of 100, 110, 200, 210, etc., and their symmetry-related reflections.

In its calcined form, the crystalline material may be further characterized by an X-ray diffraction pattern with at least one peak at a position greater than about 18 Angstrom Units d-spacing (4.909° 2θ for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal.

More particularly, the calcined crystalline non-layered material may be characterized by an X-ray diffraction pattern with at least two peaks at positions greater than about 10 Å d-spacing (8.842°θ for Cu K-alpha radiation), at least one of which is at a position greater than about 18 Å d-spacing, and no peaks at positions less than about 10 Å d-spacing with relative intensity greater than about 20% of the strongest peak. Still more particularly, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined inorganic, non-layered crystalline material may also be characterized as having a pore size of about 13 Å or greater as measured by physisorption measurements, described below. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of 2θ, where θ is the Bragg angle, and a counting time of 10 seconds for each step. The interplanar spacings, d's, were calculated in Å (Å), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). The diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described below.

The ammonium form of the catalytic material may be readily converted to the hydrogen form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions and it is preferred that the material should be in this from for use in the present catalysts.

The crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, described below. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, described below, and a solvent or solvent mixture, such as, for example, $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | where e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the desired crystalline material.

A second method for synthesis of the crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, described below. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each described below, and a solvent or solvent mixture, such as, for example, $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | where e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the precise value of the pH is not important for crystallization.

A third method for synthesis of the crystalline material is where X comprises aluminum and Y comprises silicon, the crystallization temperature must be from about 25° C. to about 175° C., preferably from about 50° C. to about 150° C., and an organic directing agent, described below, or, preferably a combination of that organic directing agent plus an additional organic agent, described below, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | where e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_2/O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_2/O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. The crystals are then separated from the liquid and recovered. Following the synthesis, the crystalline material should be subjected to treatment to remove part or all of any organic constituent.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, various embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods include:

| W  | X  | Y  | Z |
|----|----|----|---|
| —  | Al | Si | — |
| —  | Al | —  | P |
| —  | Al | Si | P |
| Co | Al | —  | P |
| Co | Al | Si | P |
| —  | —  | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

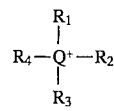

where Q is nitrogen or phosphorus and wherein at least one of $R_1$, $R_2$, $R_3$ and $R_4$ is aryl or alkyl of from 6 to about 36 carbon atoms, e.g. —$C_6H_{13}$, —$C_{10}H_{21}$, —$C_{16}H_{33}$ and —$C_{18}H_{37}$, or combinations thereof, the remainder of $R_1$, $R_2$, $R_3$ and $R_4$ being selected from hydrogen, alkyl of from 1 to 5 carbon atoms and combinations of these. The compound from which the above ammonium or phosphonium ion is derived may be, for example, the hydroxide, halide, silicate, or mixtures of these.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, benzyltrimethylammonium, cetylpyridinium, myristyltrimethylammonium, decyltrimethylammonium, dodecyltrimethylammonium and dimethyldidodecylammonium.

The reaction mixture components can be supplied by more than one source. The reaction mixture can be prepared either batchwise or continuously. Crystal size and crystallization time of the new crystalline material will vary with the nature of the reaction mixture employed and the crystallization conditions.

CATALYST BINDER

The crystals prepared by the synthesis procedure can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The size of the pores in the present mesoporous catalytic materials is large enough that the spatiospecific selectivity with respect to transition state species in reactions such as cracking is minimized (Chen et al., "Shape Selective Catalysis in Industrial Applications", 36 CHEMICAL INDUSTRIES, pgs. 41–61 (1989) to which reference is made for a discussion of the factors affecting shape selectivity), Diffusional limitations are also minimized as a result of the very large pores.

The crystals of the mesoporous support material will be composites with a matrix material which is resistant to the temperatures and other conditions employed in the hydrogenation process to form the finished catalyst. Such materials include active and inactive materials and synthetic or naturally occurring zeolites as well as inorganic materials such as clays and/or oxides such as alumina, silica or silica-alumina. The latter may be either naturally occurring or in the form of gelatinous precipitates or gels including mixtures of silica and metal oxides. Use of a material in conjunction with the zeolite, i.e., combined therewith or present during its synthesis, which itself is catalytically active may change the conversion and/or selectivity of the catalyst. Inactive materials suitably serve as diluents to control the amount of conversion so that alkylation products can be obtained economically and orderly without employing other means for controlling the rate of reaction. These materials may be incorporated into naturally occurring clays, e.g., bentonite and kaolin, to improve the crush strength of the catalyst under commercial operating conditions and function as binders or matrices for the catalyst. The mesoporous material is usually composited with the matrix in amounts from 80:20 to 20:80 by weight, typically from 80:20 to 50:50 mesoporous material:matrix. Compositing may be done by conventional means including mulling the materials together followed by extrusion of pelletizing into the desired finished catalyst particles.

The preferred catalysts for the present purpose have a significant pore volume with pore diameters greater than 200 Å. The large diameter pores provide channels for bulky PAO oligomers to transport freely with diminished diffusion resistance to the smaller particles of the crystalline material which provide a large surface area for the hydrogenation reaction. A number of commercially available alumina binders conform to this requirement and may be used. The pore size distributions of three are set out below.

Consistent with the requirement to permit the lube molecules to obtain ready, diffusion-free access to the crystalline material which acts as the support for the metal component which performs the essential hydrogenation function, the binder should have a pore size and distribution which is adequate to permit the feed components to enter the interior pore structure of the catalyst where the desired hydrogenation reactions take place at the metal sites on the crystalline material. To this extent, the binder will normally have a minimum pore size of about 50 Å i.e with no less than about 5 percent of the pores having a pore size less than 50 Å pore size, with the majority of the pores having a pore size in the range of 50–400 Å (no more than 5 percent having a pore size above 400 Å), preferably with no more than about 30 percent having pore sizes in the range of 200–400 Å.

METAL COMPONENT

Catalyst Metal Component

The hydrogenation catalyst includes a metal as the hydrogenation-dehydrogenation component. The hydrogenation-dehydrogenation component is provided by a metal or combination of metals. Noble metals of Group VIII, especially palladium, platinum, rhodium, iridium or base metals of Groups IVB, VIB and VIII, especially chromium, molybdenum, tungsten, cobalt and nickel, may be used. The combination of at least one Group VIB metal such as tungsten with at least one Group VIII metal such as nickel is particularly preferred for many applications, for example, combinations such as nickel-molybdenum, cobalt-nickel, nickel-tungsten, cobalt-nickel-molybdenum and nickel-tungsten-titanium. For certain applications, where sulfur and other contaminants such as phosphorus are in low concentrations in the feedstock, e.g. sulfur or phosphorous <10 ppm, palladium or platinum is preferred.

The content of the metal component will vary according to its catalytic activity. Thus, the highly active noble metals may be used in smaller amounts than the less active base metals. For example, about 1 wt. percent or less palladium or platinum will be effective and in a preferred base metal combination, about 7 wt. percent nickel and about 2.1 to about 21 wt. percent tungsten, expressed as metal. The present support materials are, however, notable in that they are capable of including a greater proportion of metal than previous support materials because of their extraordinarily large surface area. The metal component may exceed about 30 percent in a monolayer. The hydrogenation component can be exchanged onto the support material, impregnated into it or physically admixed with it. If the metal is to be impregnated into or exchanged onto the mesoporous support, it may be done, for example, by treating the zeolite with a palladium or platinum metal-containing ion. Suitable platinum compounds include chloroplatinic acid, platinous chloride and various compounds containing the platinum amine complex. The metal compounds may be either compounds in which the metal is present in the cation of the compound and compounds in which it is present in the anion of the compound. Both types of compounds can be used. Palladium or platinum compounds in which the metal is in the form of a cation of cationic complex, e.g., $Pd(NH_3)_4Cl_2$ or $Pt(NH_3)_4Cl_2$ are particularly useful, as are anionic complexes such as the vanadate and metatungstate ions. Cationic forms of other metals are also very useful since they may be exchanged onto the crystalline material or impregnated into it.

EXAMPLES

Examples 1 to 19 below illustrate the preparation of the mesoporous crystalline materials used to prepare the catalysts. In these examples, the sorption data for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 dupont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

One hundred grams of cetyltrimethylammonium (CTMA) hydroxide solution, prepared by contacting a 29 wt. % N,N,N-trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was placed in a steam box at 95° C. overnight. The mixture had a composition in terms of moles per mole $Al_2O_3$:

2.7 moles $Na_2O$ 392 moles $SiO_2$ 35.7 moles $(CTMA)_2O$ 61.7 moles $(TMA)_2O$ 6231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 $m^2/g$ and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The product of this example may be characterized by X-ray diffraction as including a very strong relative intensity line at 37.8±2.0 Å d-spacing, and weak lines at 21.6±1.0 and 19.2±1.0 Å. Transmission electron microscopy (TEM) produced images of a hexagonal arrangement of uniform pores and hexagonal electron diffraction pattern with a $d_{100}$ value of about 39 Å.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

2.7 moles $Na_2O$ 291 moles $SiO_2$ 35.7 moles $(CTMA)_2O$ 102 moles $(TMA)_2O$ 6120 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 993 $m^2/g$ and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

The X-ray diffraction pattern of the calcined product may be characterized as including a very strong relative intensity line at 39.3±2.0 Å d-spacing, and weak lines at 22.2±1.0 and 19.4±1.0 Å. TEM indicated that the product contained the ultra-large pore material.

A portion of the above product was then contacted with 100% steam at 1450° F. for two hours. The surface area of the steamed material was measured to be 440 $m^2/g$, indicating that about 45% was retained following severe steaming.

Another portion of the calcined product of this example was contacted with 100% steam at 1250° F. for two hours. The surface area of this material was measured to be 718 $m^2/g$, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:

0.65 moles $Na_2O$ 65 moles $SiO_2$ 8.8 moles $(CTMA)_2O$ 1.22 moles $(TPA)_2O$ 1336 moles $H_2O$ The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

0.65 moles $Na_2O$ 65 moles $SiO_2$ 15 moles $(CTMA)_2O$ 1.22 moles $(TPA)_2O$ 35.6 moles $(TMA)_2O$ 2927 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1085 $m^2/g$ and the following equilibrium adsorption capacities in grams/100 grams:

$H_2O$ 11.5

Cyclohexane >50 n-Hexane 39.8

Benzene 62

The X-ray diffraction pattern of the calcined product of this example may be characterized as including a very strong relative intensity line at 38.2±2.0 Å d-spacing, and weak lines at 22.2±1.0 and 19.4±1.0 Å. TEM indicated the product contained the ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:

0.23 moles $Na_2O$ 33.2 moles $SiO_2$ 6.1 moles $(CTMA)_2O$ 5.2 moles $(TMA)_2O$ 780 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1043 $m^2/g$ and the following equilibrium adsorption capacities in grams/100 grams:

| | |
|---|---|
| $H_2O$ | 6.3 |
| Cyclohexane | >50 |
| n-Hexane | 49.1 |
| Benzene | 66.7 |

The X-ray diffraction pattern of the calcined product may be characterized as including a very strong relative intensity line at 40.8±2.0 Å d-spacing, and weak lines at 23.1±1.0 and 20.1±1.0 Å. TEM indicated that the product contained the ultra-large pore material.

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurred with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole $Al_2O_3$:

1.0 moles $P_2O_5$ 0.51 moles $(Pyr)_2O$ 47.2 moles $H_2O$

The resulting solid product was recovered by filtration and dried in air at ambient temperature. The product was then calcined at 540° C. for 1 hour in nitrogen, followed by 6 hours in air.

The calcined product proved to have a surface area of 707 $m^2/g$ and the following equilibrium adsorption capacities in grams/100 grams:

| | |
|---|---|
| $H_2O$ | 33.2 |
| Cyclohexane | 19.7 |
| n-Hexane | 20.1 |
| Benzene | 23.3 |

The X-ray diffraction pattern of the calcined product may be characterized as including a very strong relative intensity line at 25.4±1.5 Å d-spacing. TEM indicated the product contained the present ultra-large pore material.

EXAMPLE 6

A solution of 1.35 grams of $NaAlO_2$ (43.5% $Al_2O_3$, 30% $Na_2O$) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

0.25 moles $Al_2O_3$ 10 moles $Na_2O$ 36 moles $SiO_2$ 0.95 moles $(CTMA)_2O$ 2.5 moles $(TEA)_2O$ 445 moles $H_2O$ The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % $SiO_2$ and 5.1 wt. % $Al_2O_3$, and proved to have a benzene equilibrium adsorption capacity of 58.6 grams/100 grams.

The X-ray diffraction pattern of the calcined product may be characterized as including a very strong relative intensity line at 31.4±1.5 Å d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole $SiO_2$:

0.5 mole $(CTMA)_2O$ 46.5 moles $H_2O$

The resulting solid product was recovered by filtration, washed with water, then calcined at 540° C. for 1 hour in nitrogen, followed by 10 hours in air.

The calcined product composition included less than 0.01 wt. % Na, about 98.7 wt. % $SiO_2$ and about 0.01 wt. % $Al_2O_3$, and proved to have a surface area of 896 $m^2/g$. The calcined product had the following equilibrium adsorption capacities in grams/100 grams:

| | |
|---|---|
| $H_2O$ | 8.4 |
| Cyclohexane | 49.8 |
| n-Hexane | 42.3 |
| Benzene | 55.7 |

The X-ray diffraction pattern of the calcined product of this example may be characterized as including a very strong relative intensity line at 40.0±2.0 Å d-spacing and a weak line at 21.2±1.0 Å. TEM indicated that the product of this example contained at least three separate phases, one of which was the ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole $SiO_2$:

0.5 mole $(CTMA)_2O$ 46.5 moles $H_2O$

The resulting solid product was recovered by filtration, washed with water, then calcined at 540° C. for 6 hours in air.

The calcined product composition was measured to include 0.01 wt. % Na, 93.2 wt. % $SiO_2$ and 0.016 wt. % $Al_2O_3$, and proved to have a surface area of 992 $m^2/g$ and the following equilibrium adsorption capacities in grams/100 grams:

| | |
|---|---|
| $H_2O$ | 4.6 |
| Cyclohexane | >50 |
| n-Hexane | >50 |
| Benzene | 62.7 |

The X-ray diffraction pattern of the calcined product may be characterized as including a very strong relative intensity line at 43.6±2.0 Å d-spacing and weak lines at 25.1±1.5 and 21.7±1.0 Å. TEM indicated that the product contained the ultra-large pore material.

EXAMPLE 9

Sodium aluminate (4.15 g) was added slowly into a solution containing 16 g of myristyltrimethylammonium bromide ($C_{14}TMABr$) in 100 g of water. Tetramethylammonium silicate (100 g-10% $SiO_2$), HiSil (25 g) and tetramethylammonium hydroxide (14.2 g-25% solution) were then added to the mixture. The mixture was crystallized in an autoclave at 120° C. with stirring for 24 hours.

The product was filtered, washed and air dried. Elemental analysis showed the product contained 53.3 wt. % $SiO_2$, 3.2 wt. % $Al2O3$, 15.0 wt. % C, 1.88 wt. % N, 0.11 wt. % Na and 53.5 wt. % ash at 1000° C. The X-ray diffraction pattern of the material after calcination at 540° C. for 1 hour in $N_2$ and 6 hours in air includes a very strong relative intensity line at 35.3±2.0 Å d-spacing and weak lines at 20.4±1.0 and 17.7±1.0 Å d-spacing. TEM indicated that the product contained the ultra-large pore material.

The washed product, having been exchanged with 1N ammonium nitrate solution at room temperature, then calcined, proved to have a surface area of 827 $m^2/g$ and the following equilibrium adsorption capacities in g/100 g anhydrous sorbent:

| | |
|---|---|
| $H_2O$ | 30.8 |
| Cyclohexane | 33.0 |
| n-Hexane | 27.9 |
| Benzene | 40.7 |

EXAMPLE 10

Sodium aluminate (8.3 g) was added slowly into a solution containing 184 g of dodecyltrimethylammonium hydroxide ($Cl_2TMAOH$, 50%) solution diluted with 480 g of water. UltraSil (50 g) and an aqueous solution of tetramethylammonium silicate (200 g-10% $SiO_2$) and tetramethylammonium hydroxide (26.38 g-25% solution) were then added to the mixture. The mixture was crystallized in an autoclave at 100° C. with stirring for 24 hours.

The product was filtered, washed and air dried. After calcination at 540° C. for 1 hour in $N_2$ and 6 hours in air, the X-ray diffraction pattern includes a very strong relative intensity line at 30.4±1.5 Å d-spacing and weak lines at 17.7±1.0 and 15.3±1.0 Å d-spacing. TEM indicated that the product contained the ultra-large pore material.

The washed product, having been exchanged with 1N ammonium nitrate solution at room temperature, then calcined, proved to have a surface area of 1078 $m^2/g$ and the following equilibrium adsorption capacities in g/100 g anhydrous sorbent:

| | |
|---|---|
| $H_2O$ | 32.6 |
| Cyclohexane | 38.1 |
| n-Hexane | 33.3 |
| Benzene | 42.9 |

EXAMPLE 11

A solution of 4.9 grams of $NaAlO_2$ (43.5 % $Al_2O_3$, 30% $NaO_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole $Al_2O_3$:

1.1 moles $Na_2O$ 30.6 moles $SiO_2$ 3.0 moles $(TEA)_2O$ 3.25 moles $(CTMA)_2O$ 609 moles $H_2O$ The resulting solid product was recovered by filtration, washed with water then calcined at 540° C. for 16 hours in air. The calcined product proved to have a surface area of 1352 m$^2$/g and the following equilibrium adsorption capacities in grams/100 grams:

| | |
|---|---|
| H$_2$O | 23.6 |
| Cyclohexane | >50 |
| n-Hexane | 49 |
| Benzene | 67.5 |

The X-ray diffraction pattern of the calcined product may be characterized as including a very strong relative intensity line at 38.5±2.0 Å d-spacing and a weak line at 20.3±1.0 Å. TEM indicated that the product contained the ultra-large pore material.

EXAMPLE 12

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole Al$_2$O$_3$:

1.25 moles Na$_2$O
27.8 moles SiO$_2$
5.1 moles (CTMA)$_2$O
4.40 moles (TMA)$_2$O
650 moles H$_2$O The resulting solid product was recovered by filtration and dried in air at ambient temperature. The product was then calcined at 540° C. for 1 hour in nitrogen, followed by 6 hours in air. TEM indicated that this product contained the ultra-large pore material. The X-ray diffraction pattern of the calcined product of this example can be characterized as including a very strong relative intensity line at 44.2±2.0 Å d-spacing and weak lines at 25.2±1.5 and 22.0±1.0 Å.

The calcined product proved to have a surface area of 932 m$^2$/g and the following equilibrium adsorption capacities in grams/100 grams:

| | |
|---|---|
| H$_2$O | 39.3 |
| Cyclohexane | 46.6 |
| n-Hexane | 37.5 |
| Benzene | 50 |

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole Al$_2$O$_3$:

1.25 moles Na$_2$O
27.8 moles SiO$_2$
5.1 moles (CTMA)$_2$O
4.4 moles (TMA)$_2$O
650 moles H$_2$O The resulting solid product was recovered by filtration and dried in air at ambient temperature. The product was then calcined at 540° C. for 1 hour in nitrogen, followed by 6 hours in air. The calcined product proved to have the following equilibrium adsorption capacities in grams/100 grams:

| | |
|---|---|
| H$_2$O | 35.2 |
| Cyclohexane | >50 |
| n-Hexane | 40.8 |
| Benzene | 53.5 |

The X-ray diffraction pattern of the calcined product may be characterized as including a very strong relative intensity line at 39.1±2.0 Å d-spacing and weak lines at 22.4±1.0 and 19.4±1.0 Å. TEM indicated that this product contained the ultra-large pore material.

EXAMPLE 14

A mixture of 125 grams of 29% CTMA chloride aqueous solution, grams of water, 3 grams of sodium aluminate (in 50 grams H$_2$O), 65 grams of Ultrasil, amorphous precipitated silica available from PQ corporation, and 21 grams NaOH (in 50 grams H$_2$O) was stirred thoroughly and crystallized at 150° C. for 168 hours. The reaction mixture had the following relative molar composition in terms of moles per mole silica:

0.10 moles (CTMA)$_2$O
21.89 moles H$_2$O
0,036 moles NaAlO$_2$
0.53 moles NaOH

The solid product was isolated by filtration, washed with water, dried for 16 hours at room temperature and calcined at 540° C. for 10 hours in air. The calcined product proved to have a surface area of 840 m$^2$/g, and the following equilibrium adsorption capacities in grams/100 grams:

| | |
|---|---|
| H$_2$O | 15.2 |
| Cyclohexane | 42.0 |
| n-Hexane | 26.5 |
| Benzene | 62 |

The X-ray diffraction pattern of the calcined product may be characterized as including a very strong relative intensity line at 40.5±2.0 Å d-spacing. TEM indicated that the product contained the ultra-large pore material.

EXAMPLE 15

To make the primary template mixture for this example, 240 grams of water was added to a 92 gram solution of 50% dodecyltrimethylammonium hydroxide, 36% isopropyl alcohol and 14% water such that the mole ratio of Solvent/R$_{2/f}$O was 155. The mole ratio of H$_2$O/R$_{2/f}$O in this mixture was 149 and the IPA/R$_{2/f}$O mole ratio was 6. To the primary template mixture was added 4.15 grams of sodium aluminate, 25 grams of HiSil, 100 grams of aqueous tetramethylammonium silicate solution (10% SiO$_2$) and 13.2 grams of 25% aqueous tetramethylammonium hydroxide solution.

The mole ratio of $R_{2/f}O/(SiO_2+Al_2O_3)$ was 0.28 for the mixture.

This mixture was stirred at 25° C. for 1 hour. The resulting mixture was then placed in an autoclave at 100° C. and stirred at 100 rpm for 24 hours. The mixture in the autoclave had the following relative molar composition in terms of moles per mole $SiO_2$:

0.05 mole $Na_2O$ 0.036 mole $Al_2O_3$ 0.18 mole $(Cl_2TMA)_2O$ 0.12 mole $(TMA)_2O$ 36.0 moles $H_2O$ 1.0 mole IPA The resulting solid product was recovered by filtration, washed with water and dried in air at ambient temperature. The product was then calcined at 540° C. for 1 hour in nitrogen, followed by 6 hours in air.

The calcined product proved to have a surface area of 1223 m²/g and the following equilibrium adsorption capacities in grams/100 grams:

| | |
|---|---|
| $H_2O$ | 25.5 |
| Cyclohexane | 41.1 |
| n-Hexane | 35.1 |
| Benzene | 51 |

The X-ray diffraction pattern of the calcined product may be characterized as including a very strong relative intensity line at 30.8±1.5 Å d-spacing and weak lines at 17.9±1.0 and 15.5±1.0 Å. TEM indicated this product to contain the ultra-large pore material.

EXAMPLE 16

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

0.81 mole $(C_{10}TMA)_2O$ 47.6 moles $H_2O$

The resulting solid product was filtered and washed several times with warm (60°–70° C.) distilled water and with acetone. The final product was calcined to 538° C. in $N_2$/air mixture and then held in air for about 8 hours. The calcined product proved to have a surface area of 915 m²/g and an equilibrium benzene adsorption capacity of 35 grams/100 grams. Argon physisorption data indicated an argon uptake of 0.34 cc/gram, and a pore size of 15 Å.

The X-ray diffraction pattern of the calcined product of this example may be characterized as including a very strong relative intensity line at 27.5±1.5 Å d-spacing and weak lines at 15.8±1.0 and 13.7±1.0 Å. TEM indicated that the product of this example contained the ultra-large pore material.

EXAMPLE 17

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

1.25 moles $Na_2O$ 27.8 moles $SiO_2$ 5.1 moles $(CTMA)_2O$ 2.24 moles $(TMA)_2O$ 2256 moles $H_2O$ 80.53 moles 1,3,5-trimethylbenzene The resulting product was filtered and washed several times with warm (60°–70° C.) distilled water and with acetone. The final product was calcined to 538° C. in $N_2$/air mixture and then held in air for about 10 hours. The calcined product proved to have an equilibrium benzene adsorption capacity of >25 grams/100 grams.

The X-ray diffraction pattern of the calcined product may be characterized as including a broad, very strong relative intensity line at about 102 Å d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Å d-spacing and about 120 Å d-spacing.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

1.25 moles $Na_2O$ 27.8 moles $SiO_2$ 5.1 moles $(CTMA)_2O$ 2.24 moles $(TMA)_2O$ 2256 moles $H_2O$ 132.7 moles 1,3,5-trimethylbenzene The resulting product was filtered and washed several times with warm (60°–70° C.) distilled water and with acetone. The final product was calcined to 538° C. in $N_2$/air mixture and then held in air for about 10 hours. The calcined product proved to have a surface area of 915 m²/g and an equilibrium benzene adsorption capacity of >25 grams/100 grams. Argon physisorption data indicated an argon uptake of 0.95 cc/gram, and a pore size centered on 78 Å (Dollimore-Heal Method, see Example 22(b)), but running from 70 to greater than 105 Angstoms. The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product contained several materials with different $d_{100}$ values as observed in their electron diffraction patterns. These materials were found to possess $d_{100}$ values between about 85 Å d-spacing and about 110 Å d-spacing.

EXAMPLE 19

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
650 moles $H_2O$
19.9 moles 1,3,5-trimethylbenzene The resulting product was filtered and washed several times with warm (60°–70° C.) distilled water and with acetone. The final product was calcined to 538° C. in $N_2$/air mixture and then held in air for about 8 hours.

The calcined product proved to have a surface area of 975 $m^2/g$ and an equilibrium benzene adsorption capacity of >40 grams/100 grams. Argon physisorption data indicated an argon uptake of 0.97 cc/gram, and a pore size of 63 Å (Dollimore-Heal Method), with the peak occurring at $P/P_o$= 0.65.

The X-ray diffraction pattern of the calcined product of this example may be characterized as including a very strong relative intensity line at 63±5 Å d-spacing and weak lines at 36.4±2.0, 31.3±1.5 Å and 23.8±1.0 Å d-spacing. TEM indicated that the product of this example contained the ultra-large pore material.

EXAMPLE 20

Argon physisorption Determination

To determine the pore diameters of the mesoporous products with pores up to about 60 Å in diameter, 0.2 gram samples of the products of Examples 1 through 17 were placed in glass sample tubes and attached to a physisorption apparatus as described in U.S. Pat. No. 4,762,010.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., *Adsorption, Surface Area and Porosity*, 2nd ed., Academic Press, 1982). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

The step (inflection) in the isotherm, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. The adsorption peak (stated in terms of log $(P/P_o)$) may be related to the physical pore diameter (Å) by the following formula:

$$\log(P/P_o) = \frac{K}{d - 0.38} - \left[ \frac{S^4}{3(L-D/2)^3} - \frac{S^{10}}{9(L-D/2)^9} - \frac{S^4}{3(D/2)^3} + \frac{S^{10}}{9(D/2)^9} \right]$$

where d=pore diameter in nanometers, K=32.17, S=0.2446, L=d+0.19, and D=0.57.

This formula is derived from the method of Horvath and Kawazoe (G. Horvath et al., *J. Chem. Eng. Japan*, 16 (6) 470 (1983)). The constants required for the implementation of this formula were determined from a measured isotherm of ALPO-5 and its known pore size. This method is particularly useful for microporous materials having pores of up to about 60 Å in diameter.

The results of this procedure for the samples from Examples 1 through 17 are tabulated below. The samples from Examples 10, 13 and 15 gave two separate peaks, believed to be the result of two separate ultra-large pore phases in the products.

| Example | Pore Diameter, Å |
| --- | --- |
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 22.4, 30.4 |
| 16 | 15.0 |

The above method of Horvath and Kawazoe for determining pore size from physisorption isotherms was intended to be applied to pore systems of up to 20 Å diameter; but with some care as above detailed, its use can be extended to pores of up to 60 Å diameter.

In the pore regime above 60 Å diameter, the Kelvin equation can be applied. It is usually given as:

$$\ln(P/P_o) = \frac{-2\gamma V}{r_k RT} \cos \theta$$

where:

$\gamma$=surface tension of sorbate

V=molar volume of sorbate $\theta$=contact angle (usually taken for practical reasons to be 0)

R=gas constant

T=absolute temperature $r_k$=capillary condensate (pore) radius $P/P_o$=relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

In order to illuminate the microstructure of the materials by transmission electromicroscopy (TEM), samples must be thin enough for an electron beam to pass through them, generally about 500–1000 Å or so thick. The crystal morphology of the present materials usually required that they be prepared for study by ultramicrotomy. While time consuming, this technique of sample preparation is conventional. The materials are embedded in a resin, in this case a commercially available low viscosity acrylic resin L. R. WHITE (hard), which is then cured at about 80° C. for about 1½ hours. Thin sections of the block are cut on an ultramicrotome using a diamond knife and sections in the thickness range 500–1000 Å are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDPs are readily produced on modern TEM instruments using, e.g. the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the crystalline product of the present invention, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located.

Microtomed samples of materials from the Examples were examined by the techniques described above in a JEOL 200 CX transmission electron microscope operated at 200, 000 volts with an effective 2 Å objective aperture in place. The instrument has a point-to-point resolution of 4.5 Å. Other conventional experimental arrangements in high resolution (phase contrast) TEM could be used to produce equivalent images provided care is taken to keep the objective lens on the underfocus (weak leans) side of the minimum contrast lens current setting.

EXAMPLE 21

Pt/MCM-41 Catalyst Preparation

A sample of MCM-41 (40 Å) was prepared in accordance with the method described below.

The following mixture (parts by weight—pbw) was charged to an autoclave:

| | |
|---|---|
| 83.7 pbw | Cetyltrimethylammonium (CTMA) hydroxide, prepared by contacting a 29 wt. % N,N,N-trimethyl-1-hexadecylammonium chloride solution with a hydroxide-for-halide exchange resin |
| 1.7 pbw | Sodium aluminate, |
| 4.1 pbw | Tetramethylammonim silicate (10% aqueous solution), |
| 10.5 pbw | Precipitated hydrated silica (HiSil ™). |

The mixture was crystallized at 100° C. for 20 hrs. with stirring under autogeneous pressure. The resulting product was recovered by filtration and dried in air at ambient temperature. A sample of the product was calcined at 540° C. for 1 hour in nitrogen, followed by 6 hours in air for characterization.

The calcined product had a surface area of 1120 m²/g and the following equilibrium absorption capacities in grams/ 100 grams:

| | |
|---|---|
| $H_2O$ | 10.8 |
| Cyclohexane | >50 |

| | |
|---|---|
| n-hexane | >50 |
| Benzene | 67 |

The product was identified as MCM-41 with an X-ray diffraction pattern which included a very strong relative intensity line at 38.4+2.0 Å d-spacing, and weak lines at 22.6+1.0, 20.0+1.0, and 15.2+1.0 Å.

The MCM-41 crystalline product was exchanged with room temperature aqueous solutions of ammonium nitrate and subsequently dried overnight at 250° F. A portion of the resultant crystals was combined with $Al_2O_3$ (Versal 250™) to form a mixture of 65 parts, by weight MCM-41 and 35 parts alumina. Water was added to this mixture to allow the resulting catalyst to be formed into extrudates. The catalyst was activated by calcination at 950° F. in 5 v/v/min of nitrogen for 6 hours followed by the replacement of the nitrogen with 5 v/v/min of air. The calcination was completed by raising the temperature to 1000° F. and maintaining that temperature in 5 v/v/min air for 18 hours.

The calcined extrudate was exchanged with a 0.0062M $Pt(NH_3)_4Cl_2$ solution, followed by washing, drying and calcination in air at 650° F. for three hours.

EXAMPLE 22

Pd/MCM-41 Catalyst Preparation

A sample of MCM-41 (40 Å) was prepared in accordance with the method described below.

The following mixture was charged to an autoclave:

| | |
|---|---|
| 60.7 pbw | Cetyltrimethylammonium (CTMA) hydroxide, prepared by contacting a 29 wt. % N,N,N-trimethyl-1-hexadecylammonium chloride solution with a hydroxide-for-halide exchange resin |
| 1.3 pbw | Sodium aluminate, |
| 30.4 pbw | Tetramethylammonim silicate (10% aqueous solution), |
| 7.6 pbw | Precipitated hydrated silica (HiSil™). |

The mixture was crystallized at 100° C. for 20 hrs. with stirring under autogenous pressure. The resulting product was recovered by filtration and dried in air at ambient temperature. A sample of the product was calcined at 540° C. for 1 hour in nitrogen, followed by 6 hours in air. The identity of the material as MCM-41 was consistent with its properties.

The MCM-41 crystalline product was formulated into a catalyst in the same way as the platinum-containing catalyst described in Example 21 with the exception that the calcined catalyst was exchanged with aqueous $Pd(NH_3)_4Cl_2$ solution, followed by drying at room temperature for 4 hours and overnight at 250° F. before the final calcination.

EXAMPLE 23

A $Pd/SiO_2$ catalyst was made by impreganting silica spheres (Shell S-980 C 1.5) with a $Pd(NH_3)_4Cl_2$ solution using the incipient wetness method. The impregnated spheres were then dried at room temperature for 4 hours, followed by 250° F. overnight after which the catalyst was calcined in 5 v/v/min air at 550° F. for 3 hours.

EXAMPLE 24

The three noble metal containing catalysts described above (Pt MCM-41/$Al_2O_3$, Pd MCM-41/$Al_2O_3$, Pd $SiO_2$) were evaluated for hydrogenating a PAO lubricant.

The properties of the three catalysts are summarized in Table 2 below.

TABLE 2

| | Catalyst Properties | | |
|---|---|---|---|
| $SiO_2$ | Pd MCM-41[1] | Pt MCM-41[1] | Pd |
| Metal Loading, Wt % | | | |
| Pd | 0.83 | — | 0.84 |
| Pt | — | 0.54 | — |
| Surface Area, m²/g | 800 | 682 | 330 |
| Pore Volume, cc/g | 0.96 | 0.97 | 0.88 |
| Pore Distribution, % | | | |
| <50 Å | 32 | 42 | 0 |
| 50–100 Å | 16 | 12 | 41 |
| 100–200 Å | 15 | 11 | 32 |
| >200 Å | 37 | 35 | 37 |

[1]Contains 65 wt % MCM-41 and 35 wt % alumina prior to the metal addition.

The MCM-41 materials used in the catalysts containing this crystalline material had a pore opening of 40 Å. All three catalysts have 30% pore volume with pore diameters greater than 200 Å but the MCM-41 catalysts have 30–40% pore volume with pore diameters less than 50 Å.

All catalysts were evaluated in a fixed-bed pilot unit. A poly-alpha olefin (PAO) lube oligomer having the composition shown in Table 3 below was used as the feed.

TABLE 3

| Properties of PAO | |
|---|---|
| Gravity, °API | 39.2 |
| Hydrogen, wt % | 14.6 |
| Bromine Number | 27.3 |
| KV @ 40° C., cS | 26.22 |
| KV @ 100° C., cS | 5.253 |
| Viscosity Index | 136 |

The PAO was hydrogenated at 2.0 LHSV, 350 psig $H_2$ and 5000 scf/b of once-through hydrogen circulation rate. Reactor temperature was varied to obtain catalyst activity as a function of temperature. Catalyst activity is measured by the reduction of bromine number of the oil.

The results are summarized graphically in the FIGURE. The PAO feed had a bromine number of 27.3 units and, as shown in the FIGURE, the Pd MCM-41/$Al_2O_3$ catalyst is the most active catalyst. It achieved the reduction of bromine number to less than 1 at 350° F., the lowest temperature of the experiments. Pt MCM-41/$Al_2O_3$ is also quite active. The Pd/$SiO_2$ catalyst, which does not have pore volume associated with pore openings less than 50 Å, is the least active catalyst.

EXAMPLE 25

MCM-41 As An Unexpected Catalyst Support

A total of five Pd-containing catalysts were tested for hydrogenation of a low-viscosity PAO (nominal 6 cst@100° C.), including two granular carbon catalysts with >1000 m²/g surface area. The Pd/MCM-41(65%)/$Al_2O_3$(35%) catalyst was prepared using the same procedure described in Example 22. The finished Pd MCM-41/$Al_2O_3$ catalyst had a surface area of 614 m²/g. Among those catalysts tested, Pd/MCM-41 was the most active catalyst. Although the surface area of the Pd/MCM-41 catalyst was lower than any of the Pd/C catalysts, it produced products with less than 0.1 bromine number at the highest space velocity (7.5 LHSV, Table 4). This high activity of the Pd MCM-41/Al$_2$O$_3$ catalyst is unexpected and can not be attributed to support surface area alone. Table 4 summarizes the results.

TABLE 4

Catalyst Evaluation

| Catalyst | Pd (wt %) | Support | Surface Area (m$^2$/g) | LHSV (Hr$^{-1}$) | Bromine Number |
|---|---|---|---|---|---|
| A | 0.5 | Al$_2$O$_3$ | 35 | 1 | 2.7 |
| B | 0.5 | Al$_2$O$_3$ | 95 | 2 | 3.6 |
| C | 0.5 | Carbon | 1050 | 1 | 3.8 |
| D | 0.8 | Carbon | 1200 | 2 | 10.9 |
| E | 0.8 | MCM-41(65%)/Al$_2$O$_3$(35%) | 614 | 7.5 | <0.1 |

Note: Catalysts A, B, C, and D are commercial catalysts.

All experiments in Table 1 were conducted in fixed pilot units at 350° F., 315 psi hydrogen partial pressure and a hydrogen circulation rate of 200% excess hydrogen above that calculated for total olefin saturation. Properties of the PAO feed used in the above experiments are listed in Table 5.

TABLE 5

PAO Properties

| Gravity, °API | 40 |
|---|---|
| Hydrogen, wt % | 14.74 |
| Bromine Number | 29.5 |
| KV @ 40° C., cst | 25.61 |
| KV @ 100° C., cst | 5.19 |
| Viscosity Index | 137 |

EXAMPLE 26

Wide Operating Conditions for Pd/MCM-41

The Pd MCM-41/Al$_2$O$_3$ catalyst can hydrogenate PAO to a very low bromine number at a wide range of operating conditions. A total of five different operating conditions were examined using the nominal 6 cst PAO feed (Table 5). Table 6, which used a similar Pd MCM-41/Al$_2$O$_3$ catalyst identified as the Catalyst E in Table 4, illustrates feasible operation at high space velocities. The product bromine number of the product is less than 2 in each case (which represents over 93% olefin conversion)

TABLE 6

High Space Velocity Performance

| | Feed PAO | Case 1 | Case 2 | Case 3 |
|---|---|---|---|---|
| Conditions | | | | |
| LHSV, Hr$^{-1}$ | | 4 | 4 | 8 |
| P$_{H2}$, psi | 240 | 240 | 240 | |
| Excess H$_2$, % | | 400 | 400 | 400 |
| Temperature, °F. | | 263 | 323 | 310 |
| Performance | | | | |
| Bromine No. | 29.5 | 1.0 | 0.1 | 0.5 |

Table 7 illustrates feasible operation at very low pressure (Case 1) and low temperature (Case 2), respectively. The Pd/MCM-41 catalyst used to generate the data in Table 7 was prepared with MCM-41 material having a SiO$_2$:Al$_2$O$_3$ ratio of 400:1, compared to 40:1 SiO$_2$:Al$_2$O$_3$ ratio for the catalyst used to generate the data in Table 6. The properties of the 400:1 SiO$_2$:Al$_2$O$_3$ Pd/MCM-41 catalyst are given in Table 8.

The nominal 6 cst PAO feed used to generate Table 7 suffered some exposure to air with resulting peroxide contamination. Low peroxide levels, which do not exist in commercial applications, reduced catalyst activity somewhat. However, product bromine numbers less than 3, representing greater than 90% olefin conversion, were obtained in both cases.

TABLE 7

Low Temperature Performance

| | Feed PAO | Case 1 | Case 2 |
|---|---|---|---|
| Conditions | | | |
| LHSV, Hr$^{-1}$ | | 0.3 | 0.3 |
| P$_{H2}$, psi | 100 | 1000 | |
| Excess H$_2$, % | | 200 | 200 |
| Temperature, °F. | | 375 | 140 |
| Performance | | | |
| Bromine No. | 29.5 | 0.4 | 2.2 |

The data of Table 7 were generated in an isothermal pilot unit. Commercial adiabatic experience suggests that a 140° F. average temperature (Table 7, Case 2) in an isothermal unit corresponds to an inlet temperature below 100° F. in an adiabatic reactor.

TABLE 8

Pd MCM-41/Al$_2$O$_3$ Properties

| MCM-41[1] | 65 |
|---|---|
| Al$_2$O$_3$, wt % | 35 |
| Pd, wt % | 0.77 |
| Na, ppmw | 175 |
| Surface Area, m$^2$/g | 558 |

[1]400:1 SiO$_2$/Al$_2$O$_3$ ratio

EXAMPLE 27

Processing High-Viscosity PAO Over Pd MCM-41

Pd/MCM-41 was active for hydrogenation of high-viscosity PAO that contains trace amounts of chlorine and water. A nominal 40 cst PAO was used in the experiments (Table 10). The Pd MCM-41/Al$_2$O$_3$ catalyst was the same catalyst used for Cases 1 and 2 in Table 7 and its properties are given in Table 8. The experimental results are summarized in Table 9 below.

TABLE 9

High-Viscosity PAO Hydrogenation

| | Feed PAO | Case 1 | Case 2 |
|---|---|---|---|
| Conditions | | | |
| LHSV, Hr$^{-1}$ | | 1.0 | 1.0 |
| P$_{H2}$, psi | 600 | 240 | |

TABLE 9-continued

High-Viscosity PAO Hydrogenation

| | Feed PAO | Case 1 | Case 2 |
|---|---|---|---|
| Excess $H_2$, % | | 700 | 700 |
| Temperature, °F. | | 350 | 450 |
| Performance | | | |
| Bromine No. | 12.7 | 1.0 | 0.4 |

TABLE 10

Properties of High-Viscosity PAO

| KV @ 40° C., cst | 400.7 |
|---|---|
| KV @ 100° C., cst | 40.1 |
| Viscosity Index | 150 |
| Chlorine, ppmw | 132 |
| Water, ppmw | 15 |
| Bromine Number | 12.7 |

What we claim is:

1. A process for hydrogenating a lubricant hydrocarbon which comprises contacting a hydrocarbon lubricant feed having a bromine number greater than 5 in the presence of hydrogen with a hydrogenation catalyst containing a noble metal hydrogenation component on a support comprising an inorganic, porous crystalline phase material having pores with diameters of at least about 13 Angstrom Units and exhibiting, after calcination, an X-ray diffraction pattern with at least one peak at a d-spacing greater than about 18 Å with a relative intensity of 100, to produce a lubricant product having a bromine number less than 3.

2. The process of claim 1, wherein the noble metal hydrogenation component is selected from the group consisting of Pd, Pt, Rh and Ir.

3. A hydrogenation process according to claim 1 in which the crystalline phase exhibits, after calcination, a hexagonal arrangement of uniformly sized pores with diameters of at least about 13 Å and which exhibits, after calcination, a hexagonal electron diffraction pattern that can be indexed with a $d_{100}$ value greater than about 18 Angstrom Units.

4. A hydrogenation process according to claim 3 in which the crystalline phase has an X-ray diffraction pattern following calcination with at least one peak whose d-spacing corresponds to the $d_{100}$ value from the electron diffraction pattern.

5. A hydrogenation process according to claim 1 in which the crystalline phase exhibits a benzene adsorption capacity of greater than about 15 grams benzene per 100 grams of the crystalline phase material at 50 torr and 25° C.

6. A hydrogenation process according to claim 1 in which the crystalline phase has a composition expressed as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

7. A hydrogenation process according to claim 6 wherein W comprises a divalent first row transition metal or magnesium; X comprises aluminum, boron, gallium or iron; Y comprises silicon or germanium; and Z comprises phosphorus.

8. A hydrogenation process according to claim 6 wherein a and d are 0 and h=2.

9. A hydrogenation process according to claim 6 wherein X comprises aluminum, boron, gallium or iron and Y comprises silicon or germanium.

10. A hydrogenation process according to claim 6 wherein X comprises aluminum and Y comprises silicon.

11. A hydrogenation process according to claim 1 in which the feed is contacted with the catalyst at a pressure of from 100 to 1500 psig (reactor inlet), a temperature from 100° to 700° F., and a space velocity from 0.1 to 10.0 LHSV.

12. A hydrogenation process according to claim 1 in which the lubricant feed comprises a poly alpha olefin.

13. A process according to claim 12 in which the polyalphaolefin comprises a poly alpha olefin produced by the polymerization of a $C_8$–$C_{12}$ alpha-olefin.

14. A process according to claim 12 in which the poly alpha olefin is produced by the polymerization of the olefin in the presence of a Friedel-Crafts catalyst.

15. A hydrogenation process according to claim 1 in which the feed is contacted with the catalyst at a temperature of 100° to 500° F.

16. A process for hydrogenating a poly-alphaolefin lubricant having a bromine number of at least 5, which comprises contacting the lubricant in the presence of hydrogen with a hydrogenation catalyst containing a noble metal hydrogenation component on a support comprising an inorganic, porous crystalline phase material having a uniform, hexagonal arrangement of uniformly sized pores with diameters of at least about 13 Å, a benzene adsorption capacity of greater than about 15 grams benzene per 100 grams of the crystalline phase material at 50 torr and 25° C. and which exhibits, after calcination, an X-ray diffraction pattern with at least one peak at a d-spacing greater than about 18 Å with a relative intensity of 100, and a hexagonal electron diffraction pattern that can be indexed with a $d_{100}$ value greater than about 18 Å, to reduce the bromine number to a value of not more than 3.

17. The process of claim 16, wherein the noble metal hydrogenation component is selected from the group consisting of Pd, Pt, Rh and Ir.

18. A hydrogenation process according to claim 16 in which the crystalline phase material has an X-ray diffraction pattern following calcination with at least one peak whose d-spacing corresponds to the $d_{100}$ value from the electron diffraction pattern.

19. A hydrogenation process according to claim 16 in which the crystalline phase has a composition expressed as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

20. A hydrogenation process according to claim 19 wherein W comprises a divalent first row transition metal or magnesium; X comprises aluminum, boron, gallium or iron; Y comprises silicon or germanium; and Z comprises phosphorus.

21. A hydrogenation process according to claim 19 wherein a and d are 0 and h=2.

22. A hydrogenation process according to claim 20 wherein X comprises aluminum and Y comprises silicon.

23. A hydrogenation process according to claim 16 in which the feed is contacted with the catalyst at a pressure of from 100 to 1500 psig (reactor inlet), a temperature from 100° to 700° F., and a space velocity from 0.1 to 10 LHSV.

24. A process according to claim 16 in which the polyalphaolefin comprises a poly alpha olefin produced by the polymerization of a $C_8$–$C_{12}$ alpha olefin.

25. A hydrogenation process according to claim 16 in which the feed is contacted with the, catalyst at a temperature of 100° to 500° F.

* * * * *